US007409432B1

(12) United States Patent
Recio et al.

(10) Patent No.: US 7,409,432 B1
(45) Date of Patent: Aug. 5, 2008

(54) EFFICIENT PROCESS FOR HANDOVER BETWEEN SUBNET MANAGERS

(75) Inventors: Renato John Recio, Austin, TX (US); Danny Marvin Neal, Round Rock, TX (US); Gregory Francis Pfister, Austin, TX (US); Gregory Michael Nordstrom, Pine Island, MN (US); Dono Van-Mierop, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1833 days.

(21) Appl. No.: 09/692,350

(22) Filed: Oct. 19, 2000

(51) Int. Cl.
*G06F 15/16* (2006.01)
(52) U.S. Cl. ............... 709/209; 709/223; 709/208; 700/3; 707/1; 707/100; 707/101; 370/254; 370/351
(58) Field of Classification Search ............ 709/223, 709/224, 209, 208; 370/408, 400, 392, 254, 370/251; 700/3; 707/1, 100, 101
See application file for complete search history.

(56) References Cited

U.S. PATENT DOCUMENTS

| 4,104,721 | A |   | 8/1978 | Markstein et al. |
|---|---|---|---|---|
| 4,809,160 | A |   | 2/1989 | Mahon et al. |
| 5,805,072 | A | * | 9/1998 | Kakemizu ............... 370/408 |
| 5,987,011 | A | * | 11/1999 | Toh ............... 370/331 |
| 6,052,785 | A |   | 4/2000 | Lin et al. |
| 6,185,612 | B1 | * | 2/2001 | Jensen et al. ............... 709/223 |
| 6,343,320 | B1 | * | 1/2002 | Fairchild et al. ............... 709/224 |
| 6,345,294 | B1 | * | 2/2002 | O'Toole et al. ............... 709/222 |
| 6,374,357 | B1 |   | 4/2002 | Mohammed et al. |
| 6,470,453 | B1 |   | 10/2002 | Vilhuber |
| 6,480,506 | B1 | * | 11/2002 | Gubbi ............... 370/468 |
| 6,697,360 | B1 | * | 2/2004 | Gai et al. ............... 370/389 |
| 6,745,332 | B1 |   | 6/2004 | Wong et al. |
| 6,754,214 | B1 | * | 6/2004 | Mahalingaiah ............... 370/392 |
| 6,941,350 | B1 | * | 9/2005 | Frazier et al. ............... 709/209 |
| 6,981,025 | B1 | * | 12/2005 | Frazier et al. ............... 709/209 |
| 7,010,607 | B1 | * | 3/2006 | Bunton ............... 709/228 |

\* cited by examiner

*Primary Examiner*—Nathan J. Flynn
*Assistant Examiner*—Mohammad Siddiqi
(74) *Attorney, Agent, or Firm*—Diana R. Gerhardt; Dillon & Yudell LLP

(57) ABSTRACT

A method and system for efficiently merging subnets having individual subnet managers (SM) into a single network with one master SM. During discovery and configuration of a subnet, a subnet manager creates a Subnet Management Database (SMDB) representative of the subnet components being managed. Each subnet manager contains an independent SMDB. When two or more subnets are linked/connected together to form a single network, a single one of the subnet managers is selected as the master subnet manager and all the subnets' SMDBs must be merged. An SMDB record labeling mechanism is utilized to differentiate among components from the different subnets that may have the same parameter values, such as protection keys (P_keys) and re-assign individual parameters to create a single SMDB of uniquely defined components.

6 Claims, 9 Drawing Sheets

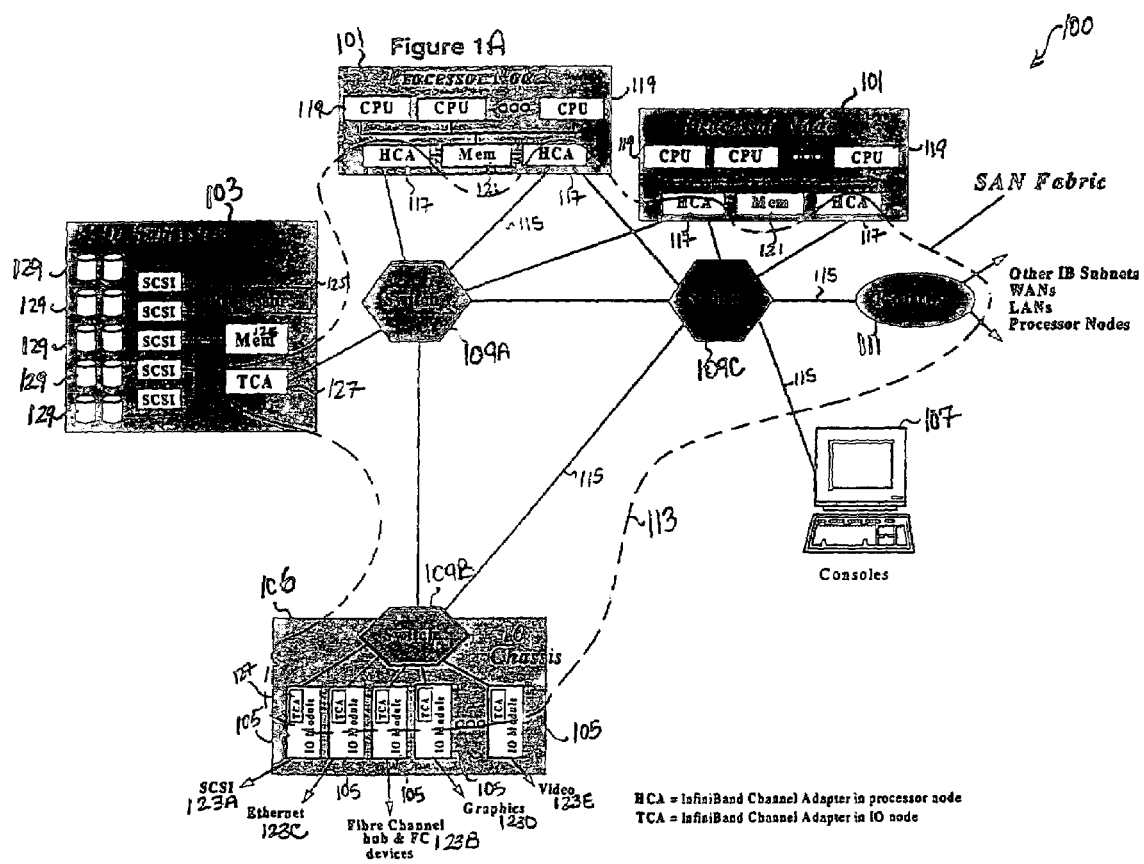

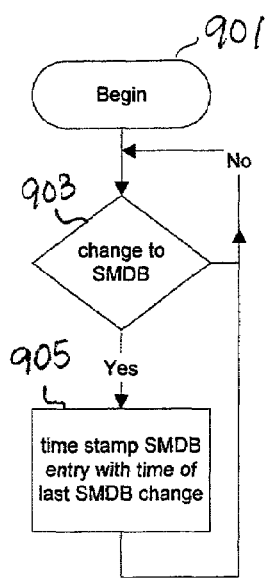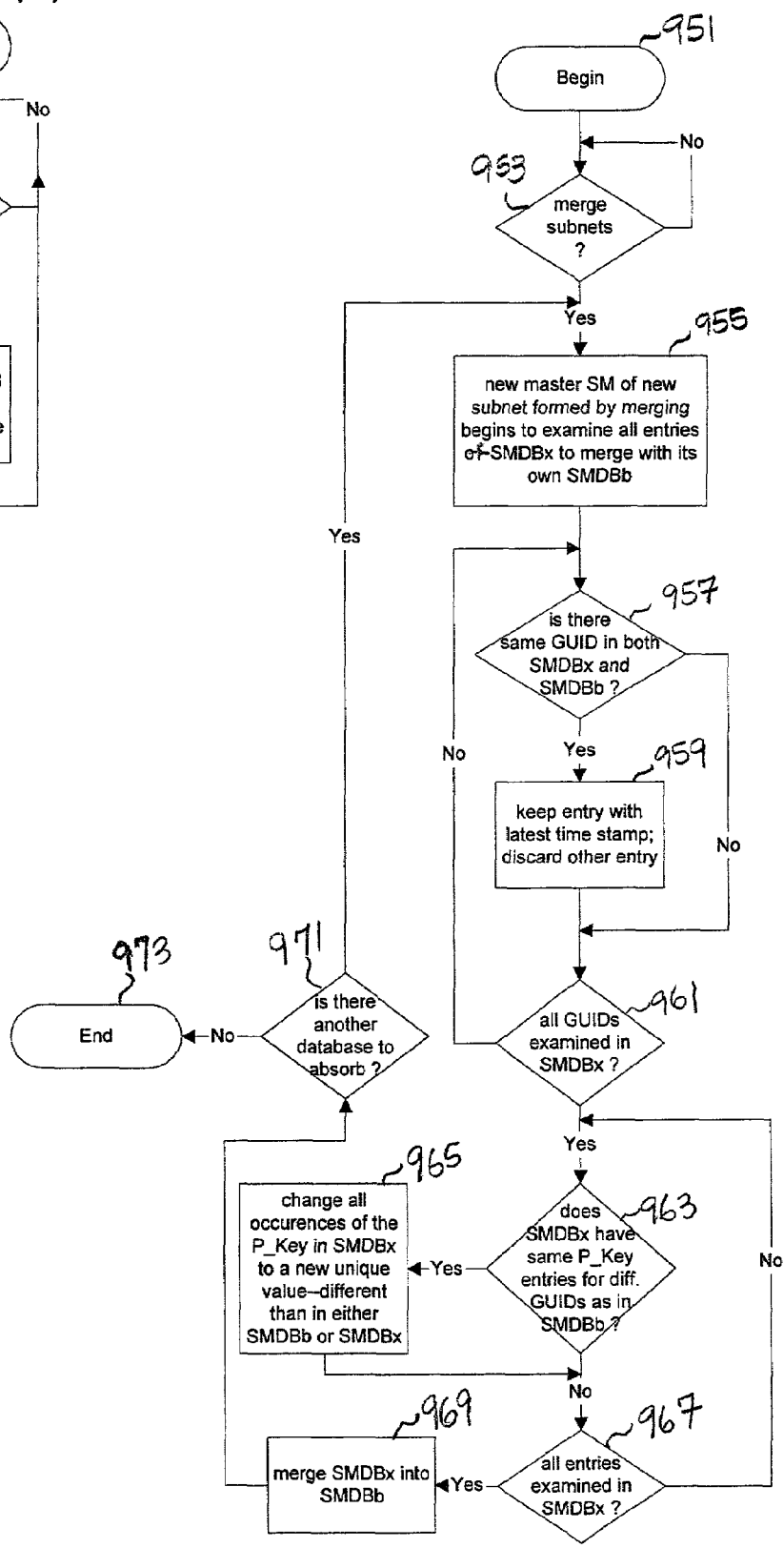

EFFICIENT PROCESS FOR HANDOVER BETWEEN SUBNET MANAGERS

RELATED APPLICATIONS

The present invention is related to the subject matter of the following commonly assigned, co-pending U.S. patent applications filed concurrently herewith: U.S. pat. No. 7,136,907 entitled "Method and System for Informing An Operating System In A System Area Network When A New Device Is Connected"; Ser. No. 09/692,347 entitled "Method and System For Scalably Selecting Unique Transaction Identifiers", now abandoned; U.S. Pat. No. 6,748,559 entitled "Method And System For Reliably Defining and Determining Timeout Values In Unreliable Datagrams"; and U.S. Pat. No. 6,851,059 entitled "Method and System For Choosing A Queue Protection Key That is Tamper-proof From An Application". The content of the above-referenced applications is incorporated herein by reference.

BACKGROUND OF THE INVENTION

1. Technical Field:

The present invention relates in general to computer networks and, in particular to merging the independent computer networks. Still more particularly, the present invention relates to a method and system for providing an efficient handover of control between Subnet managers of separate subnets, which are being merged into a single subnet.

2. Description of the Related Art:

The use of I/O interconnects to connect components of a distributed computer system is known in the art. Traditionally, in such systems, individual components are interconnected via a parallel bus, such as a PCIX bus. The parallel bus has a relatively small number of plug-in ports for connecting the components. The number of plug-in ports is set (i.e., the number cannot be increased). At maximum loading, a PCIX bus transmits data at about 1 Gbyte/second.

The introduction of high performance adapters (e.g., SCSI adapters), Internet-based networks, and other high performance network components has resulted in increased demand for bandwidth, faster network connections, distributed processing functionality, and scaling with processor performance. These and other demands are quickly outpacing the current parallel bus technology and are making the limitations of parallel buses even more visible. PCIS bus, for example, is not scalable, i.e., the length of the bus and number of slots available at a given frequency cannot be expanded to meet the needs for more components, and the limitation hinders further development of fast, efficient distributed networks, such as system area networks. New switched network topologies and systems capable of being easily expanded are required to keep up with the increasing demands, while allowing the network processes on the expanding network to be dynamically completed, i.e., without manual input.

The present invention recognizes the need for faster, more efficient computer interconnects offering the features demanded by the developments of technology. More specifically, the present invention recognizes the need for providing a mechanism within a network such as a System Area Network (SAN) consisting of multiple subnets, that provides efficient, dynamic combining of two or more subnets into a single network.

SUMMARY OF THE INVENTION

A method and system is disclosed for efficiently combining (or merging) subnets having individual master subnet managers into a single network with one master subnet manager. The invention is thus applicable to a distributed computing system, such as a system area network, having end nodes, switches, and routers, and links interconnecting these components. The switches and routers interconnect the end nodes and route packets, i.e., sub-components of messages being transmitted, from a source end node to a target end node. The target end node then reassembles the packets into the message.

During discovery and configuration of a subnet, a subnet manager creates a Subnet Management Database (SMDB) representative of the subnet components being managed. Each subnet manager contains an independent SMBD. When two or more subnets are merged (i.e., linked/connected together) to form a single network, a single one of the subnet mangers is selected as the master subnet manager and all the subnets SMBDs must be merged. The other subnet managers are relegated to standby status. In a preferred embodiment, a SMDB record labeling mechanism is utilized to differentiate among components from the different subnets that may have the same parameter values, such as protection keys (P_keys).

In one embodiment of the invention, when there are two or more separate SMDBs, each maintained by separate master subnet managers on a separate subnet, and those separate subnets are linked together (or merged) into one larger subnet, a process is provided for efficiently merging the SMDBs. In this manner the separate subnets become a single subnet, with a single master subnet and a single SMDB.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1A depicts a system area network (SAN) in which the present invention is preferably implemented;

FIG. 9A is a flow chart showing the process of time stamping SMDB entries in accordance with a preferred embodiment of the invention; and FIG. 9B is a flow chart showing the process absorbing an SMDB by a master subnet manager in accordance a preferred embodiment of the invention.

DETAILED DESCRIPTION OF THE PREFERRED EMBODIMENT

Figure 1B:
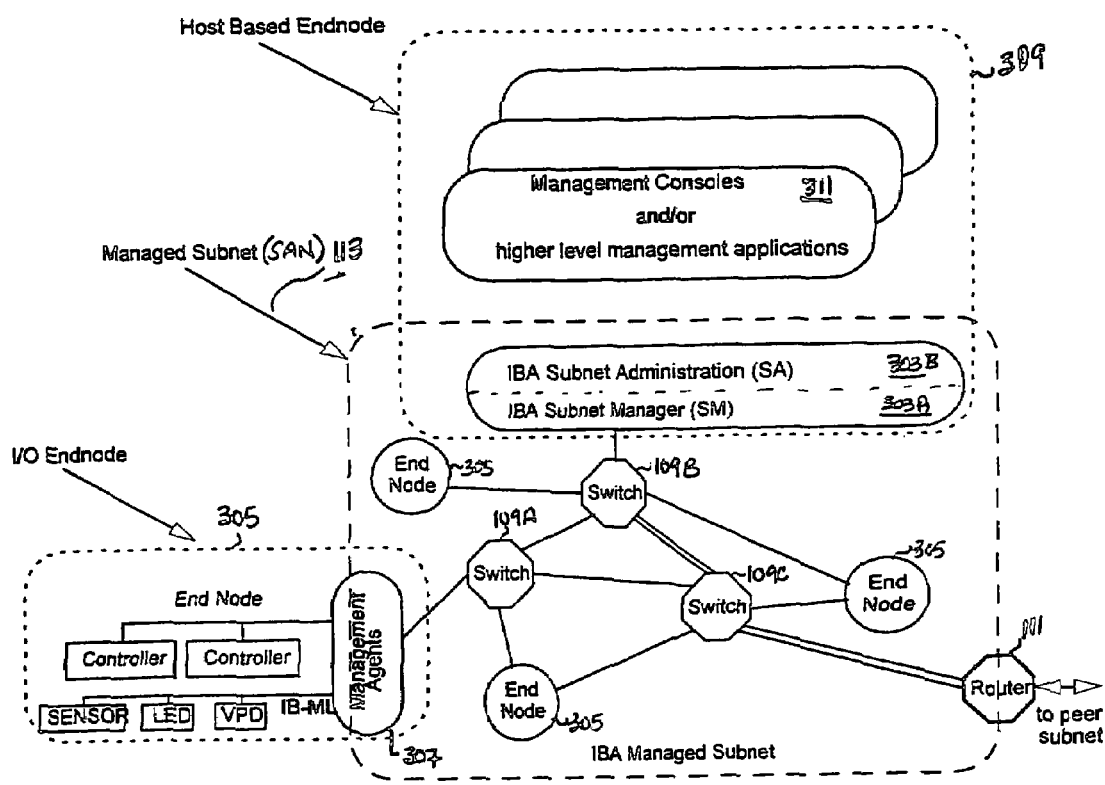
FIG. 1B is a diagram illustrating the software aspects of SAN management model in accordance with the present invention.

The present invention is directed to a method for efficient handover of control to a single master subnet manager when two or more subnets having subnet managers are merged. The invention is applicable to a distributed computer system, such as a system area network (SAN). The invention is implemented in a manner that allows the overlaps in merged subnet parameters, such as P_Keys, to be resolved.

In order to appreciate the environment within which the invention is preferably practiced, a description of a SAN configured with routers, and end nodes, etc. is provided below. Presentation of the environment and particular functional aspects of the environment which enable the invention to be practiced are provided with reference to FIGS. 1-5. Section headings have been provided to distinguish the hardware and software architecture of the SAN. However, those skilled in the art understand that the descriptions of either architecture necessarily includes to both components.

SAN HARDWARE ARCHITECTURE

With reference now to the figures and in particular with reference to FIG. 1A, there is illustrated an exemplary embodiment of a distributed computer system. Distributed computer system 100 represented in FIG. 1A is provided merely for illustrative purposes, and the embodiments of the present invention described below can be implemented on computer systems of numerous other types and configurations. For example, computer systems implementing the present invention may range from a small server with one processor and a few input/output (I/O) adapters to very large parallel supercomputer systems with hundreds or thousands of processors and thousands of I/O adapters. Furthermore, the present invention can be implemented in an infrastructure of remote computer systems connected by an Internet or intranet.

As shown in FIG. 1A, distributed computer system 100 provides a system area network (SAN) 113, which is a high-bandwidth, low-latency network interconnecting nodes within the distributed computer system. More than one (1) SAN 113 may be included in a distributed computer system 100 and each SAN 113 may comprise multiple sub-networks (subnets).

A node is herein defined to be any component that is attached to one or more links of a network. In the illustrated distributed computer system, nodes include host processors 101, redundant array of independent disks (RAID) subsystem 103, I/O adapters 105, switches 109A-109C, and router 111. The nodes illustrated in FIG. 1A are for illustrative purposes only, as SAN 113 can connect any number and any type of independent nodes. Any one of the nodes can function as an end node, which is herein defined to be a device that originates or finally consumes messages or frames in the distributed computer system 100.

SAN 113 is the communications and management infrastructure supporting both I/O and inter-processor communications (IPC) within distributed computer system 100. Distributed computer system 100, illustrated in FIG. 1A, includes switches communications fabric (i.e., links, switches and routers) allowing many devices to concurrently transfer data with high-bandwidth and low latency in a secure, remotely managed environment. End nodes can communicate over multiple ports and utilize multiple paths through SAN 113. The availability of multiple ports and paths through SAN 113 can be employed for fault tolerance and increased-bandwidth data transfers.

SAN 113 includes switches 109A-109C and routers 111. Switches 109A-109C connects multiple links together and allows routing of packets from one link to another link within SAN 113 using a small header Destination Local Identifier (DLID) field. Router 111 is capable of routing frames from one link in a first subnet to another link in a second subnet using a large header Destination Globally Unique Identifier (DGUID). Router 111 may be coupled via wide area network (WAN) and/or local area network (LAN) connections to other hosts or other routers.

In SAN 113, host processor nodes 101 and I/O nodes 106 include at least one Channel Adapter (CA) to interface to SAN 113. Host processor nodes 101 include central processing units (CPUs) 119 and memory 121. In one embodiment, each CA is an endpoint that implements the CA interface in sufficient detail to source or sink packets transmitted on SAN 113. As illustrated, there are two CA types, Host CA (HCA) 117 and Target CA (TCA) 127. HCA 117 is used by general purpose computing nodes to access SAN 113. In one implementation, HCA 117 is implemented in hardware. In the hardware implementation of HCA 117, HCA hardware offloads much of CPU and I/O adapter communication overhead. The hardware implementation of HCA 117 also permits multiple concurrent communications over a switched network without the traditional overhead associated with communicating protocols. Use of HCAs 117 in SAN 113 also provides the I/O and IPC consumes of distributed computer system 100 with zero processor-copy data transfers without involving the operating system kernel process. HCA 117 and other hardware of SAN 113 provide reliable, fault tolerant communications.

The I/O chassis includes I/O adapter backplane 106 and multiple I/O adapter nodes 105 that contain adapter cards. Exemplary adapter cards illustrated in FIG. 1A include SCSI adapter card 123A, adapter card 123B to fiber channel hub and PC-AL devices, Ethernet adapter card 123C, graphics adapter card 123D, and video adapter card 123E. Any known type of adapter card can be implemented. The I/O chassis also includes switch 109B in the I/O adapter backplane 106 to couple adapter cards 123A-123E to SAN 113.

RAID subsystem 103 includes a microprocessor 125, memory 126, a Target Channel Adapter (TCA) 127, and multiple redundant and/or striped storage disks 129.

In the illustrated SAN 113, each link 115 is a full duplex channel between any two network elements, such as end nodes, switches 109A-109C, or routers 111. Suitable links 115 may include, but are not limited to, copper cables, optical cables, and printed circuit copper traces on backplanes and printed circuit boards. The combination of links 115 and switches 109A-109C, etc. operate to provide point-to-point communication between nodes of SAN 113.

SAN SOFTWARE ARCHITECTURE

Software Components

Figure 2:
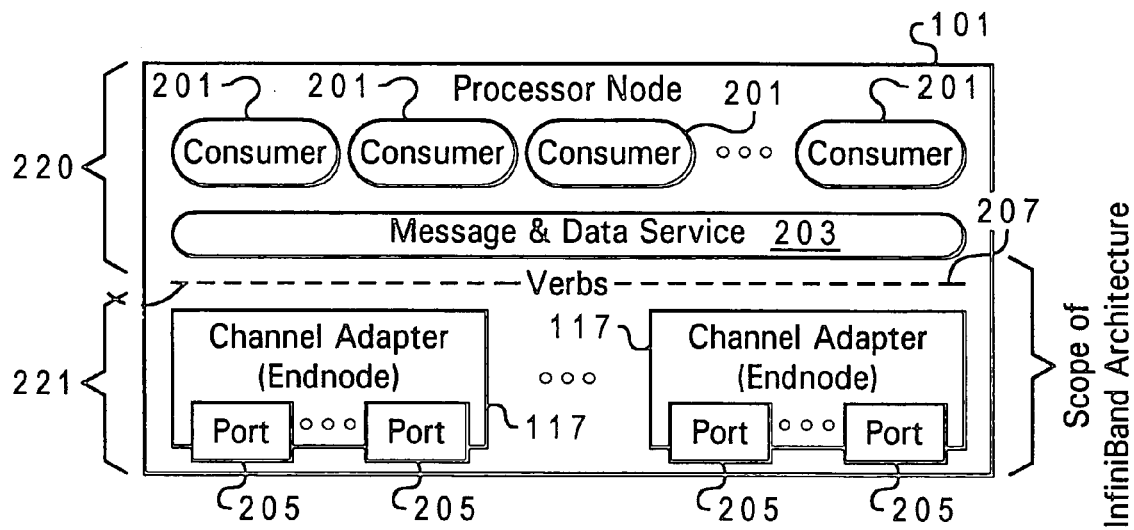
FIG. 2 is a diagram illustrating software aspects of an exemplary host processor end node for the SAN of FIG. 1 in accordance with the present invention.

Software and hardware aspects of an exemplary host processor node 101 are generally illustrated in FIG. 2. An application programming interface (API) and other software components, such as an operating system (OS) and device drives are utilized to allow software components 220 to control hardware components 221. However, the feature of software-hardware interaction at the processor node 101 is not essential to the discussion of the invention and further description is not required for the understanding of the present invention. The functionally provided by the API, OS and other components collectively provides verbs interface 207. Verbs interface 207 operates as a conduit which separates the upper software components 220 from the lower hardware components 221.

Host processor node 101 executes a set of consumer processes 201. Host processor node 101 includes HCA 117 with ports 205. Each port 205 connects a link (see line 115 of FIG. 1A). Ports 205 can connect to one SAN subnet or multiple SAN subnets. Utilizing message and data services 203, consumer processes 201 transfer messages to SAN 113 via verbs interface 207. Verbs interface 207 is generally implemented with an OS-specific programming interface.

Figure 3:
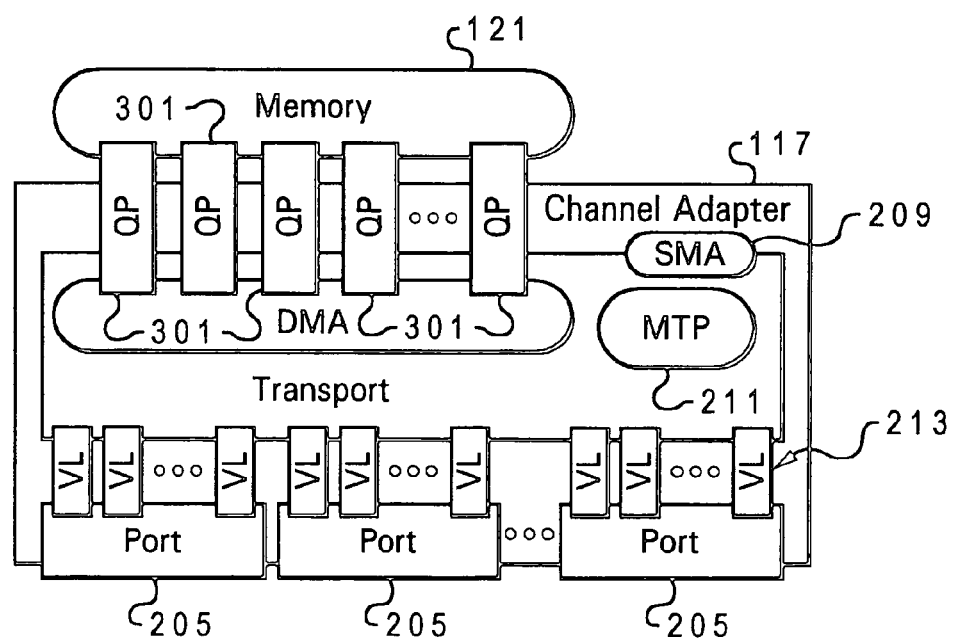
FIG. 3 is a diagram of an exemplary host channel adapter of the SAN of FIG. 1 in accordance with the present invention.

A software model of HCA 117 is illustrated in FIG. 3. HCA 117 includes a set of queue pairs (QPs) 301, which transfer messages across ports 205 to the subnet. A single HCA 117 may support thousands of QPs 301. By contrast, TCA 127 (FIG. 1A) in an I/O adapter typically supports a much smaller number of QPs 301. FIG. 3 also illustrates subnet management administration (SMA) 209, management packets 211 and a number of virtual lanes 213, which connect the transport layer with ports 205.

Turning now to FIG. 1B, there is illustrated software management model for nodes on SAN 113. SAN architecture management facilities provides a Subnet Manager (SM) 303A, a Subnet Administration (SA) 303B, and an infrastructure that supports a number of general management services. The management infrastructure requires a Subnet Management Agent (SMA) 307 operating in each node 305 and defines a general service interface that allows additional general services agents. Also, SAN architecture defines a common management datagram (MAD) message structure for communicating between managers and management agents. SM 303A is responsible for initializing, configuring and managing switches, routers, and channel adapters. SMS 303A can be implemented within other devices, such as a channel adapter or a switch. One SM 303A of SAN is dedicated as a master SM and is responsible for: (1) discovering the subnet topology; (2) configuring each channel adapter port with a rang of Local Identification (LID) numbers, Global Identification (GID) number, subnet prefix, and Partition Keys (P_Keys); (3) configuring each switch with a LID, the subnet prefix, and with its forwarding database; and (4) maintaining the end node and service database for the subnet to provide a Global Unique Identification (GUID) number to LID/GID resolution service as well as a services directory.

In a preferred embodiment, SM 303A records all configuration information for each component of the network in a SM database (SMDB). Thus, management of SAN 113 and SAN components, such as HCAs 117, TCAs (or end nodes) 127, Switches 190, and Routers 111 are completed utilizing Subnet Management (SM) 303A and Subnet Administration (SA) 303B. SMPs are used to discover, initialize, configure, and maintain SAN components through management agents 307 of end nodes 305. SAN SA packets are used by SAN components to query and update subnet management data. Control of some aspects of the subnet management is provided via a user management console 113 in host-based end node 309.

MESSAGE TRANSFER PROCESS

SAN 113 provides the high-bandwidth and scalability required for I/O and also supports the extremely low latency and low CPU overhead required for Interprocessor Communications (IPC). User processes can bypass the operating system (OS) kernel process and directly access network communication hardware, such as HCAs 117, which enable efficient message passing protocols. SAN 113 is suited to current computing models and is a building block for new forms of I/O and computer cluster communication. SAN 113 allows I/O adapter nodes 105 to communicate among themselves or communicate with any or all of the processor nodes 101 in the distributed computer system. With an I/O adapter attached to SAN 113, the resulting I/O adapter node 105 has substantially the same communication capability as any processor node 101 in the distributed computer system.

For reliable service types of messages, end nodes, such as host processor nodes 101 and I/O adapter nodes 105, generate request packets and receive acknowledgment packets. Switches 109A-109C and routers 111 pass packets along from the source to the target (or destination). Except for the variant cyclic redundancy check (CRC) trailer field, which is updated at each transfer stage in the network, switches 109A-109C pass the packets along unmodified. Routers 111 update the variant CRC trailer field and modify other fields in the header as the packet is routed.

In SAN 113, the hardware provides a message passing mechanism that can be used for Input/Output (I/O) devices and Interprocess Communications (IPC) between general computing nodes. Consumes (i.e., processing devices connected to end nodes) access SAN message passing hardware by posting send/receive messages to send/receive work queues (WQ), respectively, on a SAN Channel Adapter (CA).

A message is herein defined to be an application-defined unit of data exchange, which is a primitive unit of communication between cooperating processes. A packet (or frame) is herein defined to be one unit of data encapsulated by networking protocol headers. The headers generally provide control and routing information for directing the packet (or frame) through SAN 113. The trailer generally contains control and CRC data for ensuring that frames are not delivered with corrupted content.

Consumers use SAN verbs to access HCA functions. The software that interprets verbs and directly accesses the CA is known as the Channel Interface (CI) 219. Send/Receive work queues (WQ) are assigned to a consumer as a Queue Pair (QP). Messages may be sent over five different transport types, Reliable Connected (RC), Reliable Datagram (RD), Unreliable Connected (UC), Unreliable Datagram (UD), and Raw Datagram (RawD). Consumers retrieve the results of these messages from a Completion Queue (CQ) through SAN send and receive work completions (WC). The source CA takes care of segmenting outbound messages and sending them to the destination. The destination or target CA takes care of reassembling inbound messages and placing them in the memory space designated by the desintation's consumer. These features are illustrated in the figures below.

Figure 4:
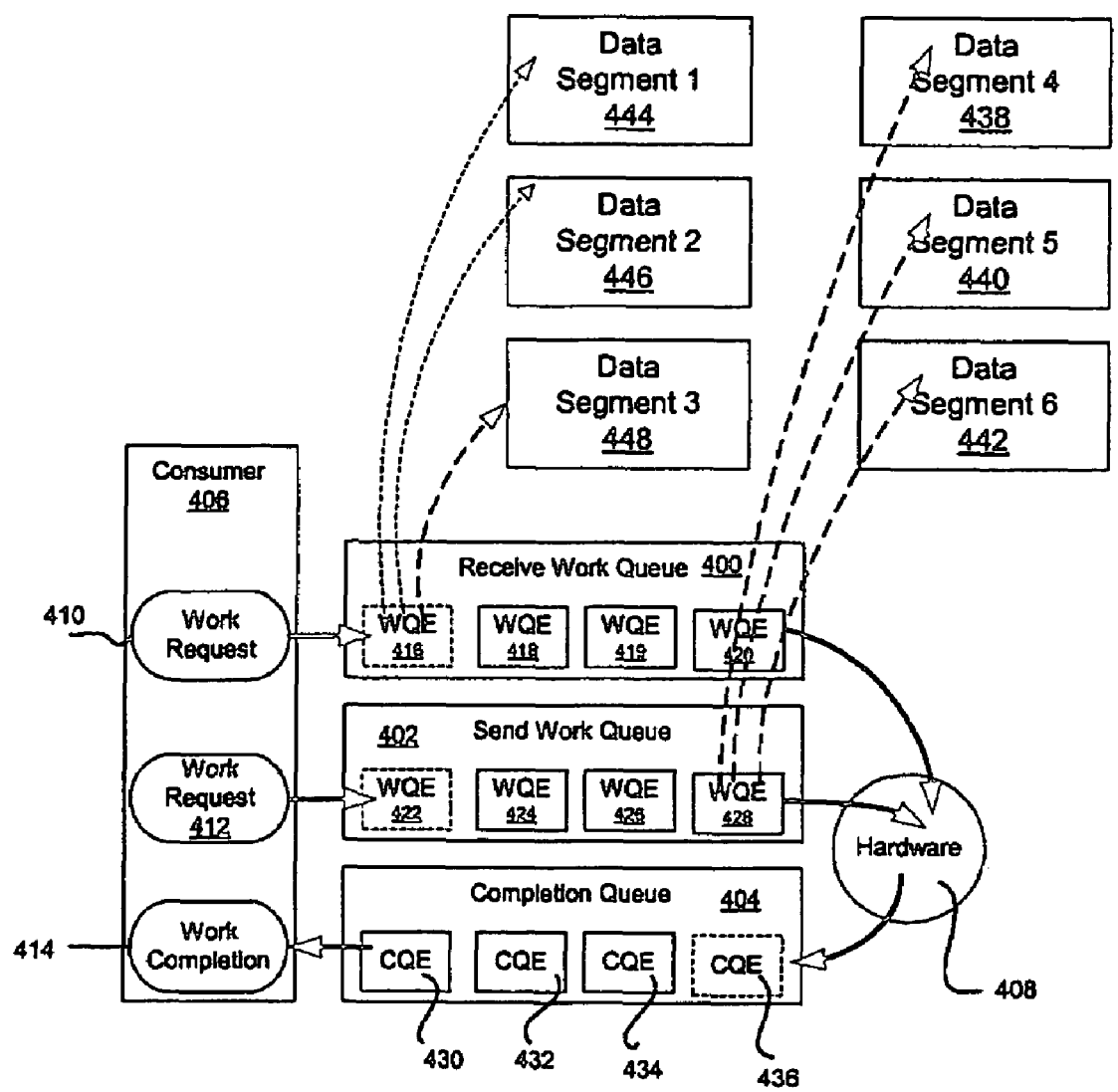
FIG. 4 is a diagram illustrating processing of work requests with queues in accordance with a preferred embodiment of the present invention.

FIGS. 4, 5, 6, and 7 together illustrate example request and acknowledgment transactions. Referring now to FIG. 4, there is illustrated a block diagram of work and completion queue processing. In FIG. 4, a receive work queue (RWQ) 400, send work queue (SWQ) 402, and completion queue 404 are present for processing requests from and for consumer 406. These requests from consumer 406 are eventually sent to hardware 408. In this example, consumer 406 generates work requests 410 and 412 and receives work completion 414.

Each QP 301 provides an input to a Send Work Queue (SWQ) 402 and a Receive Work Queue (RWQ) 400. SWQ 402 sends channel and memory semantic messages, and RWQ 400 receives channel semantic messages. A consumer calls a verb (within verbs interface 207) to place Work requests (WRs) into a work queue (WQ).

A send work request WR 412 is a channel semantic operation to push a set of local data segments to the data segments referenced by a remote node's Receive work queue element (WQE). For example, work queue element 428 contains references to data segment 4 438, data segment 5 440, and data segment 6 442. Each of the data segments of the send WR contains a virtually contiguous memory region. The virtual addresses used to reference the local data segments are in the address context of the process that created the local QP 301.

As shown in FIG. 4, work requests placed onto a work queue are referred to as work queue elements (WQEs). Send work queue 402 contains work queue elements (WQEs) 422-428, describing data to be transmitted on the SAN fabric. Receive work queue 400 contains work queue elements (WQEs) 416-420, describing where to place incoming channel semantic data from the SAN fabric. WQBs are executed (processed) by hardware 408 in the HCA. SWQ 407 contains WQEs 405 that describe data to be transmitted on the SAN fabric. RWQ 409 contains WQEs 405 that describe where to place incoming channel semantic data received from SAN 113.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote end node and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

In one embodiment, Receive Work Queues 400 only support one type of WQE, which is referred to as a receive WQE 416-420. The receive WQE 416-420 provides a channel semantic operation describing a local memory space into which incoming send messages are written. The receive WQE includes a scatter list describing several virtually contiguous memory spaces. An incoming send message is written to these memory spaces. The virtual addresses are in the address contexts of the process that created the local QP 301.

The verbs interface 207 also provides a mechanism for retrieving completed work from completion queue 404. Completion queue 404 contains Completion Queue Elements (CQEs) 430-436 which contain information about previously completed WQEs. CQEs 430-436 are employed to create a single point of completion notification for multiple QPs 301. CQE contains sufficient information to determine the QP 301 and specific WQE that completed. A completion queue context is a block of information that contains pointers to length and other information needed to manage the individual completion queues 404.

Figure 5:
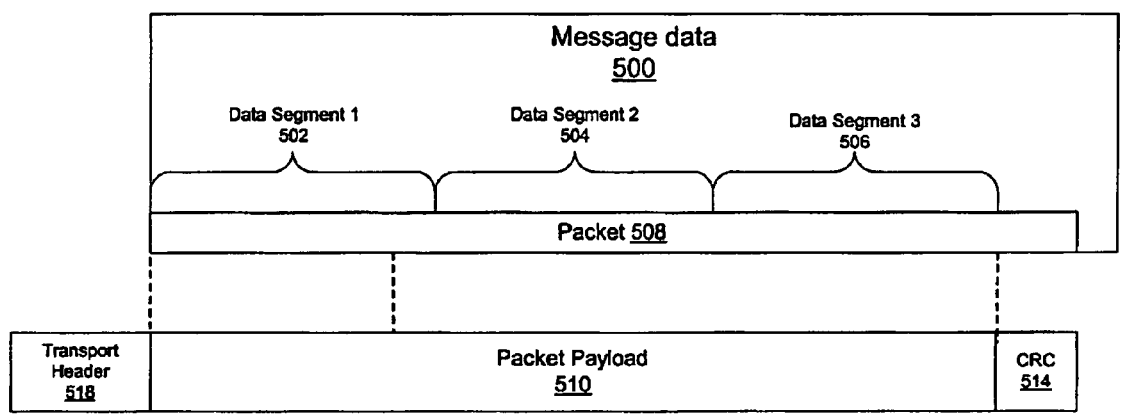
FIG. 5 is an illustration of a data packet in accordance with a preferred embodiment of the present invention.

Turning next to FIG. 5, an illustration of a data packet is depicted in accordance with a preferred embodiment of the present invention. Message data 500 contains data segment 1 502, data segment 504, and data segment 3 506, which are similar to the data segments illustrated in FIG. 4. In this example, these data segments form a packet 508, which is placed into packet payload 510 within data packet 512. Additionally, data packet 512 contains CRC 514, which is used for error checking. Additionally, routing header 516 and transport 518 are present in data packet 512. Routing header 516 is used to identify source and destination ports for data packet 512. Transport header 518 in this example specifies the destination queue pair for data packet 512. Additionally, transport header 518 also provides information such as the operation code, packet sequence number, and partition for data packet 512.

The operating code identifies whether the packet is the first, last, intermediate, or only packet of a message. The operation code also specifies whether the operation is a send RDMA write, read, or atomic. The packet sequence number is initialized when communications is established and increments each time a queue pair creates a new packet. Ports of an end node may be configured to be members of one or more possibly overlapping sets called partitions.

If a reliable transport service is employed, when a request packet reaches its destination end node, acknowledgment packets are used by the destination end node to let the request packed sender know the request packet was validated and accepted at the destination. Acknowledgment packets acknowledge one or more valid and accepted request packets. The requester can have multiple outstanding request packets before it receives any acknowledgments. In one embodiment, the number of multiple outstanding messages is determined when a QP is created.

Figure 6:
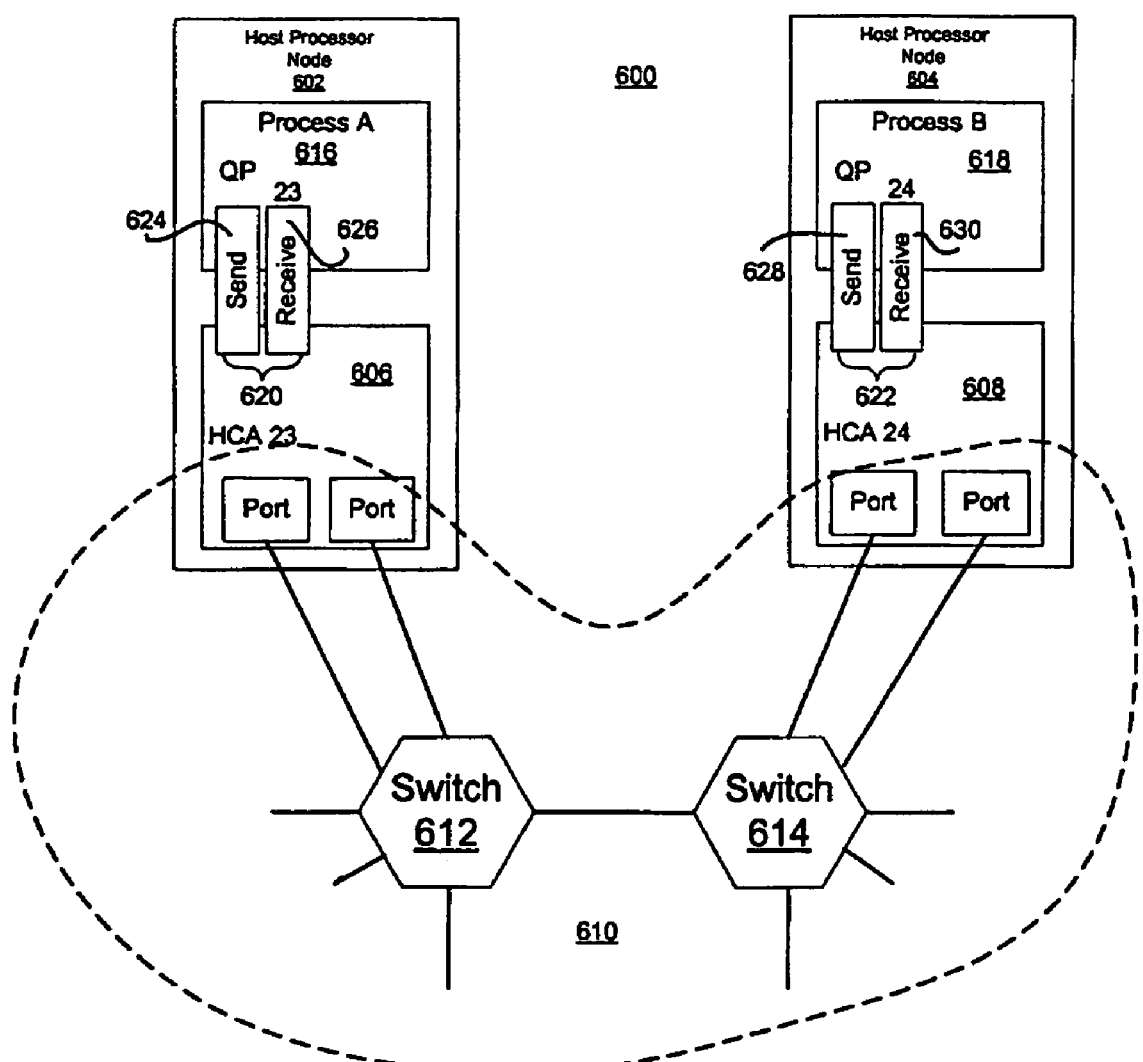
FIG. 6 is a diagram illustrating a communication over a portion of a SAN fabric.

Referring to FIG. 6, a schematic diagram illustrating a portion of a distributed computer system is depicted in accordance with the present invention. The distributed computer system 600 in FIG. 6 includes a host processor node 602 and 604. Host processor node 602 includes a HCA 606, and host processor node 604 includes a HCA 608. The distributed computer system 600 in FIG. 6 includes a SAN fabric 610 which includes a switch 612 and a switch 614. The SAN fabric 610 in FIG. 6 includes a link coupling HCA 606 to switch 612; a link coupling switch 612 to switch 614; and a link coupling HCA 608 to switch 614.

In the example transactions, host processor node 602 includes client process A 616, and host processor node 604 includes client process B 618. Client process A 616 interacts with HCA hardware 606 through QP 620. Client process B 618 interacts with HCA hardware 608 through QP 622. QP 620 and QP 622 are data structures. QP 620 includes send work queue 624 and a receive work queue 626. QP 622 also includes send work queue 628 and receive work queue 630.

Process A 616 initiates a message request by posting WQEs to the send queue 624 of QP 620. Such a WQE is illustrated by WQE 428 in FIG. 4. The message request of client process A 616 is referenced by a gather list contained in the send WQE 428. Each data segment in the gather list points to a virtually contiguous local memory region, which contains a part of the message. This is indicated by data segments 4 438, 5 440, and 6 442, which respectively hold message parts 4, 5, and 6.

Hardware in HCA 606 reads the WQE and segments the message stored in virtual contiguous buffers into packets, such as packet 512 in FIG. 5. Packets are routed through the SAN fabric 610, and for reliable transfer services, are acknowledged by the final destination end node, which in this case is host processor node 604. If not successively acknowledged, the packet is re-transmitted by the source end node, host processor node 602. Packets are generated by source end nodes and consumed by destination end nodes.

Figure 7:
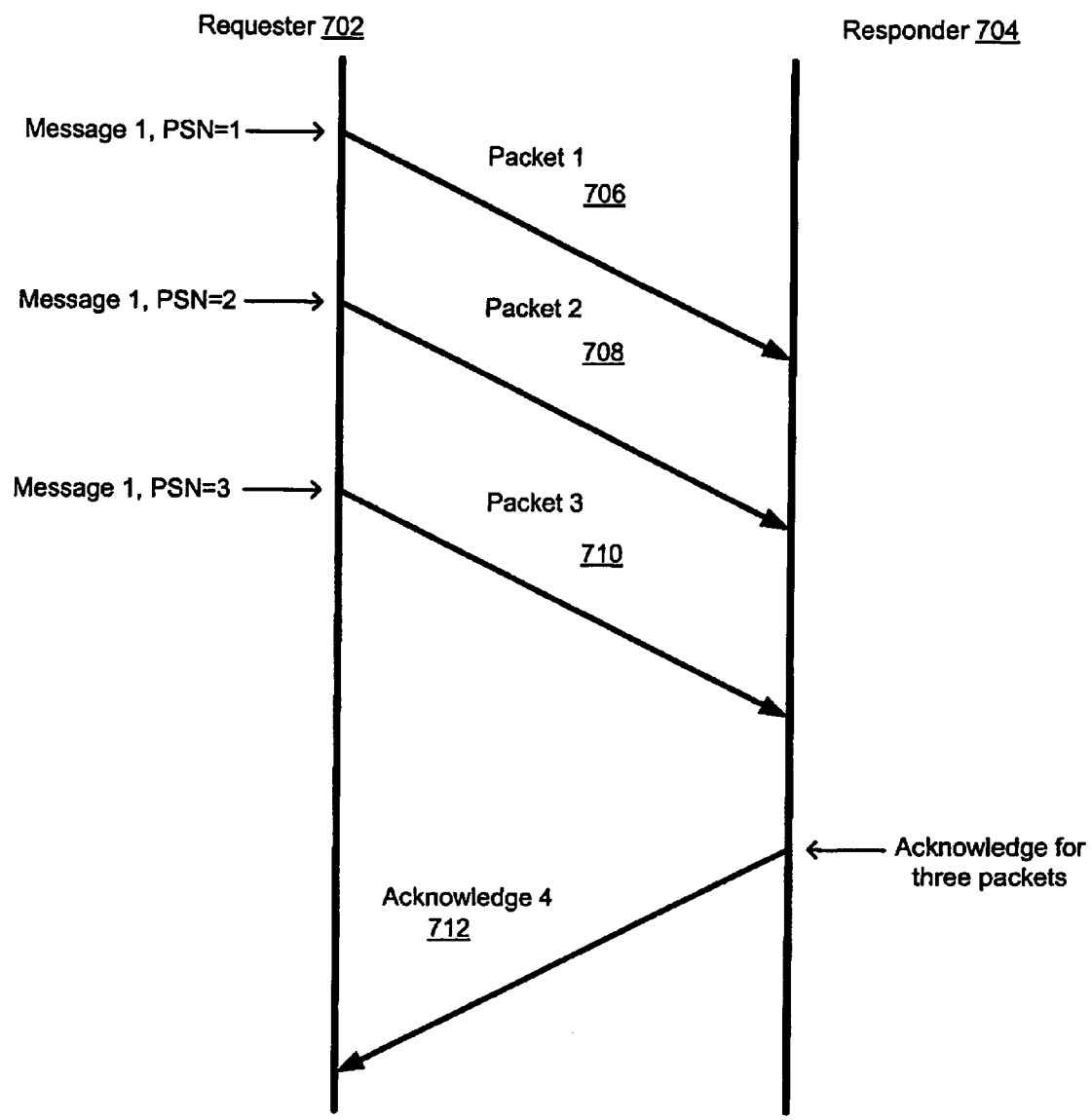
FIG. 7 is a diagram illustrating packet transfers in accordance with the invention.

Referring now to FIG. 7, the send request message is transmitted from source end node 702 to destination end node 704 as packets 1 706, 2 708, 3 710, and 4 712. Acknowledgment packet 4 712 acknowledges that all 4 request packets were received.

The message in FIG. 7 is being transmitted with a reliable transport service. Switches (and routers) that relay the request and acknowledgment packets do not generate any packets, only the source and destination HCAs do (respectively).

REMOTE OPERATION FUNCTIONALITY

SAN 113, with its interlinked arrangement of components and sub-components, provides a method for completing remote operations, by which processor nodes may directly control processes in I/O nodes. Remote operation also permits the network to manage itself. A remote direct memory access (RDMA) Read work request (WR) provides a memory semantic operation to read a virtually contiguous space on a remote node. A memory space can either be a portion of a memory region or a portion of a memory window. A memory region references a previously registered set of virtually contiguous memory addresses defined by a virtual address and length. A memory window references a set of virtually contiguous memory addresses which have been bound to a previously registered region.

The RDAM Read WR writes the data to a virtually contiguous local memory space. Similar to Send WR 403, virtual addresses used by the RDMA Read WQE to reference the local data segments are in the address context of the process that created the local QP 301. The remote virtual addresses are in the address context of the process owning the remote QP targeted by the RDMA Read WQE.

RDMA Write WQE provides a memory semantic operation to write a virtually contiguous memory space on a remote node. RDMA Write WQE contains a scatter list of local virtually contiguous memory spaces and the virtual address of the remote memory space into which the data from the local memory spaces is written.

RDMA FetchOp WQE provides a memory semantic operation to perform an atomic operation on a remote word. RDMA FetchOp WQE is a combined RDMA Read, Modify, and Write operation. RDMA FetchOp WQE can support several read-modify-write operations, such as "Compare and Swap if Equal."

A Bind (unbind) remote access key (R_Key) WQE provides a command to the HCA hardware to modify a memory window by associating the memory window to a memory region. A second command to destroy a memory window by disassociating the memory window from a memory region is also provided. The R_Key is part of each RDMA access and is used to validate that the remote process has permitted access to the buffer.

EFFICIENT PROCESS FOR HANDOVER BETWEEN SUBNET MANAGERS

The present invention makes use of the features described in the subject matter of U.S. Pat. No. 6,990,528 "ASSOCIATION OF END-TO-END CONTEXT VIA RELIABLE DATAGRAM DOMAINS" filed on Oct. 19, 2000, the entire content of which is hereby incorporated by reference. The referenced application allows Reliable Datagram QPs to be used for communicating across multiple partitions. In SAN 113, QPs that support SAN Service Types are associated with a partition and cannot communicate to QPs that are outside of the partition to which the QP is associated. The QP is barred from communicating with QPs in another partition even if the node_s HCA port, which the QP uses, has access to different partitions. RD QPs, however, can communicate with any given partition the node_s HCA has access to, so long as there is an underlying End-End Context (EEC) which is associated with the given partition.

The present invention provides a method for seamlessly merging (i.e., linking or connecting) two independent subnets having separate subnet managers (SMs) into a single SAN 113 with a master SM selected from among the separate SMs. The invention utilizes time stamps and GUID addresses on SMDB entries as an aid for a Subnet Manager to efficiently absorb the SMDB of another subnet manager during the subnet management handover process.

Figure 8:
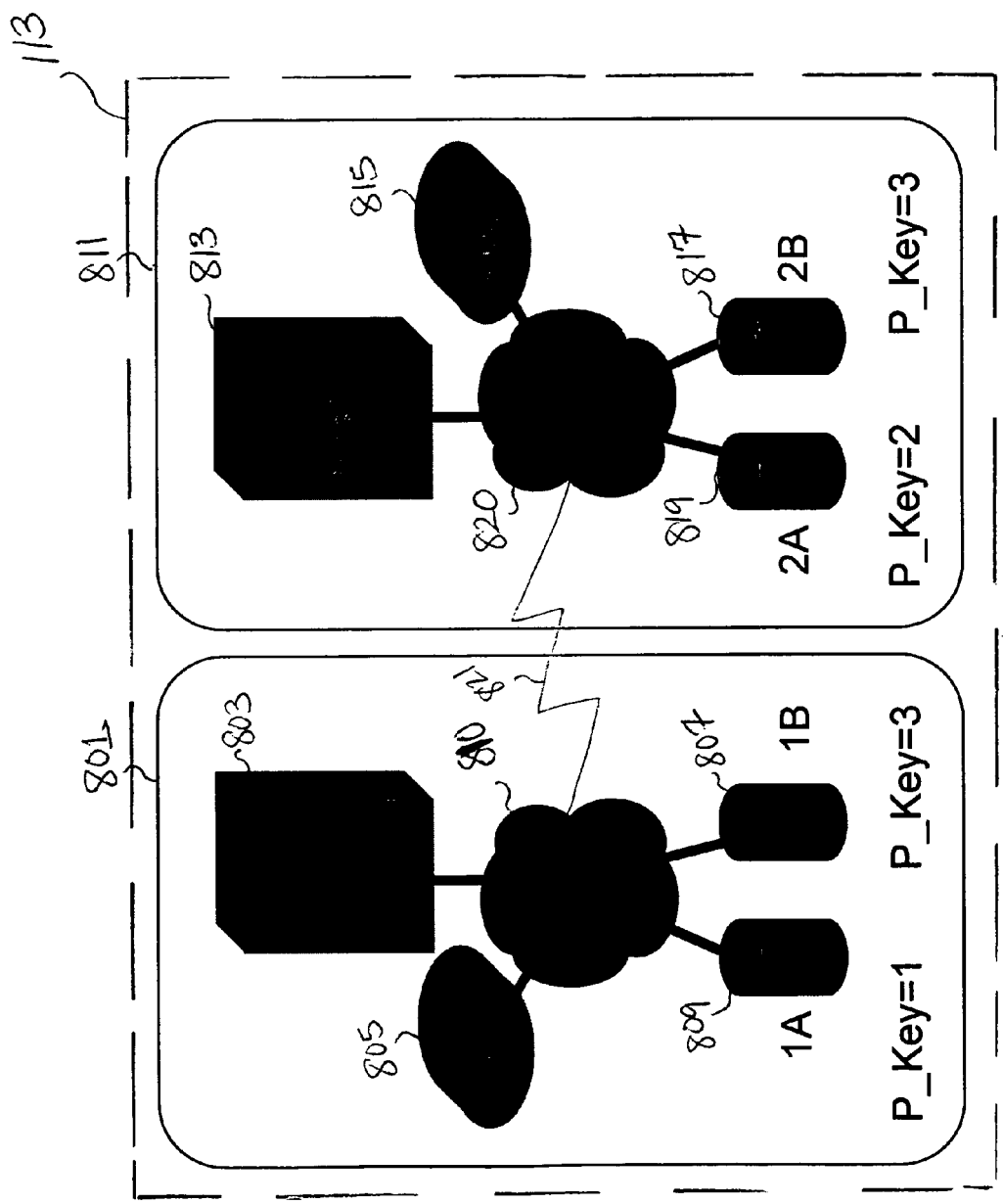
FIG. 8 is a diagram illustrating two independent networks, which are linked together to form a single network in accordance with a preferred embodiment of the invention.

FIG. 8 illustrates a SNA 113 comprising two separate systems (subnets), each having its own master subnet managers, which are interlinked. System 1 801 includes Host1 803, Master Subnet Manager SM1 805, and device 1A 809 and 1B 807 all interconnected via subnet 810. System 2 811 includes Host2 813, Master Subnet Manager SM2 815, and devices 2A 819 and 2B 817 connected to subnet 820. In the illustrative embodiment, both systems utilize the same P_Key assignments. Device A1 809 has a P_Key assigned with a value of 1, and device 1B 807 has a P_Key assigned with a value of 5. Device 2A 819 has a P_Key assigned with a value of 2, and device 2B 817 has a P_Key assigned with a value of 5. Thus, the two systems are joined together via a link 821 to from SAN 113. Devices 1B 807 and 2B 817 of different systems are each assigned to P_Key value of 5. In a preferred embodiment, the invention provides a method for handling the overlaps which occur in the $P_{13}$ Key assignments when the systems are merged, as described below. The linking of the two systems may be completed via a switch as described above and illustrated in FIG. 1A.

When the two systems of FIG. 8 are initially merged, one of the two master subnet managers is relegated to a standby subnet manager, while the other SM becomes the master subnet manager of the new merged subnet (SAN 113). Selection of the particular SM that becomes the master SM of the merged system may be dependent on priority values associated with each SM during their initial configuration. In a priority scheme, the SM with the highest priority is automatically selected as the master SM. The Priority value may be assigned by a subnet administrator when the subnet is initially configured. In the event that two SMs have been same priority value, then, in the preferred embodiment, the SM with the lowest GUID is selected to be the master subnet manager. During the handover process, the master subnet manager of the newly-formed merged network receives the SMDB of the other subnet manager, reconfigures the network or network components where necessary and takes over management of the total merged network.

The method utilized by the present invention to accomplish the seamless transfer of SMDB involves timestamping each SMDB with the time at which the last change was made in that SMDB. With this timestamp, the SM that is, accepting the handover can then determine the correct action to take in handling each entry as the SMDB(s) being taken over is being absorbed. Referring to FIG. 9A, the process of time stamping entries in SMDB is illustrated. The process begins at block 901, and following, a determination is made whether there is a change to a Subnet Management Database at block 903. If not then the process loops back to 901. If there was a change, then the entry is time stamped with the time of the last change to the entry in that SMDB, and the process returns to block 901.

Referring now to FIG. 9B, the process begins at block 951. Next, a determination is made at block 953 whether there is a merge of subnets occurring. If, however, a merge of subnets is occurring, the master subnet manager of the new subnet being formed by merging two or more subnets begins to example all entries of SMDBs with it's own SMDBb at block 955. As utilized herein, SMDBx refers to the database of subnets whose subnet managers are not selected as the master subnet manager when a merger of the subnets occurs. SMDBb refers to the database of the master subnet manager prior to merger of the database.

Returning to FIG. 9B, a determination is made at block 957 whether the master subnet manager finds the same GUID entry in both SMDBx and SMBDb. If the same GUID entry is found, the master subnet manager keeps the one with the latest time stamp and discards the other at block 959. If, however, the same GUIDs are not found, the process moves to block 961.

Next a determination is made at block 961 whether all GUIDS have been examined in SMDBx. If not all the GUIDs have been examined then the process returns to block 957; however, if all the GUIDs have been examined, the process moves to block 963, where a determination is made whether SMDBx has the same P_Key entries for different GUIDS as in SMDBb. If yes, then the master subnet manager will change all occurrences of the P_Key in SMDBx to a new unique P_Key value, which is different than that in either SMDBx or SMDBb at block 965. The process then moves to block 967. If the P_Key entries are not the same for SMDBx and SMDBb, then a determination is made at block 967 whether all entries in SMDBx have been examined. If all the entries have not been examined, the process returns to block 963. If all entries have been examined in SMDBx, then the SMDBx is merged with SMDBb at block 969. Next, a determination is made at block 971 whether there is another database to be merged with master subnet manager's SMBDb, and if so, the process returns to block 955. Otherwise, the process ends at block 973.

There may be other overlapping information in the respective databases that may need to be merged as described for the P_Keys and GUIDs above. These would follow a similar process as described in FIG. 9B.

In the above detailed description of the preferred embodiments, reference is made to the accompanying drawings which form a part hereof, and in which is shown, by way of illustration, specific embodiments in which the invention may be practice. It is to be understood that other embodiments may be utilized and structural or logical changes may be made without departing from the scope of the present invention. For example, although the invention is described with reference to multiple computing nodes accessing a single database, the invention is applicable to all other transactions occurring on the network. The above detailed description, therefore, is not to be taken in a limiting sense, and the scope of the present invention is defined by the appended claims.

As a final matter, it is important to note that while an illustrative embodiment of the present invention has been, and will continue to be, described in the context of a fully functional data processing system, those skilled in the art will appreciate that the software aspects of an illustrative embodiment of the present invention are capable of being distributed as a program product in a way of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

What is claimed is:

1. A method for efficiently merging subnets comprising the steps of:

linking a first subnet, having a first subnet manager and a first database utilized to control the entire first subnet, with a second subnet, having a second subnet manager and a second database utilized to control the entire second subnet, to create a merged subnet;

wherein said first and second database comprise configuration entries, each including time-stamped partition key (P Key) and global unique identifier (GUID), which time-stamp indicates a time that said configuration entries are created and modified by respective ones of said first and second subnet managers; and dynamically selecting and configuring one of said first subnet manager and said second subnet manager as a master subnet manager, which controls the entire merged subnet, wherein control of the entire merged subnet includes control of both said first subnet and said second subnet, wherein said dynamically selecting and configuring includes:

determining that a first P Key entry of a GUID of said second database of said second subnet manager is the same as a second P key entry of a different GUID of said first database; and in response to said determining, changing all occurrences of said P Key in said second database to a new P Key value that is not one of said P Key values within said first database and said second database.

2. The method of claim 1, wherein said first subnet manager is selected as said master subnet manager, said method further comprising the step of:

absorbing said subnet configuration entries from said database of the second subnet manager to said database of said master subnet manager to create a merged database of subnet configuration entries.

3. The method of claim 2, wherein said absorbing step further comprises the steps of:

determining that a first GUID entry of said second database is the same as a second GUID entry of said first database; and in response to said determining step, selecting a most recent time-stamped GUID entry from among said first GUID entry and said second GUID entry as a representative GUID entry for said merged database.

4. The method of claim 3, further comprising the step of discarding a GUID entry not selected as said representative GUID entry.

5. The method of claim 2, further comprising the step of configuring said merged subnet utilizing said master subnet manager.

6. The method of claim 1, wherein said first and second subnets each comprises multiple nodes wired together to create a wired subnet that is controlled by a single subnet manager, and said selecting step provides a single master subnet manager, and further comprises de-activating the management function of the subnet manager not selected as the single master subnet manager.

* * * * *